United States Patent Office 2,892,091
Patented June 23, 1959

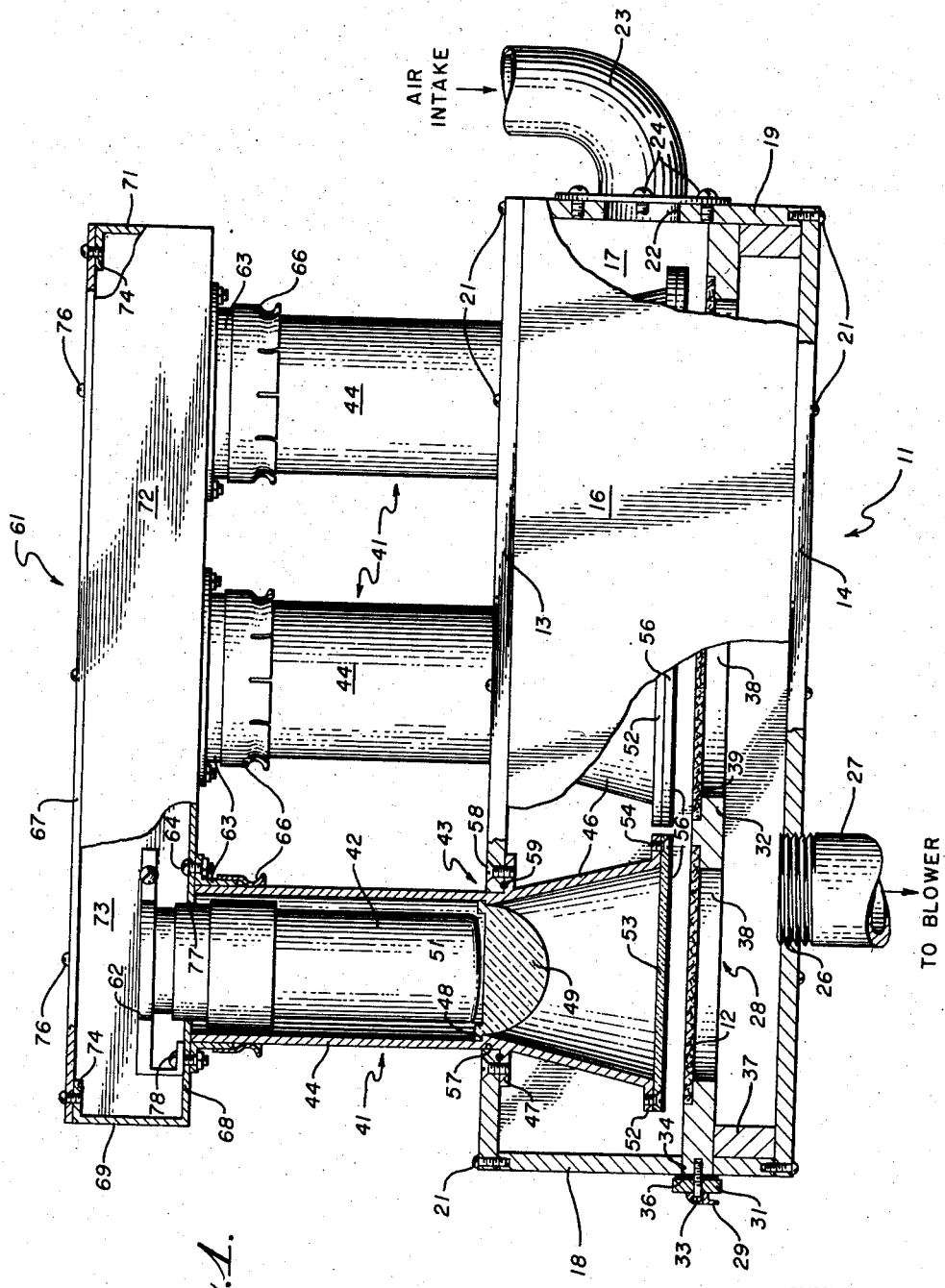

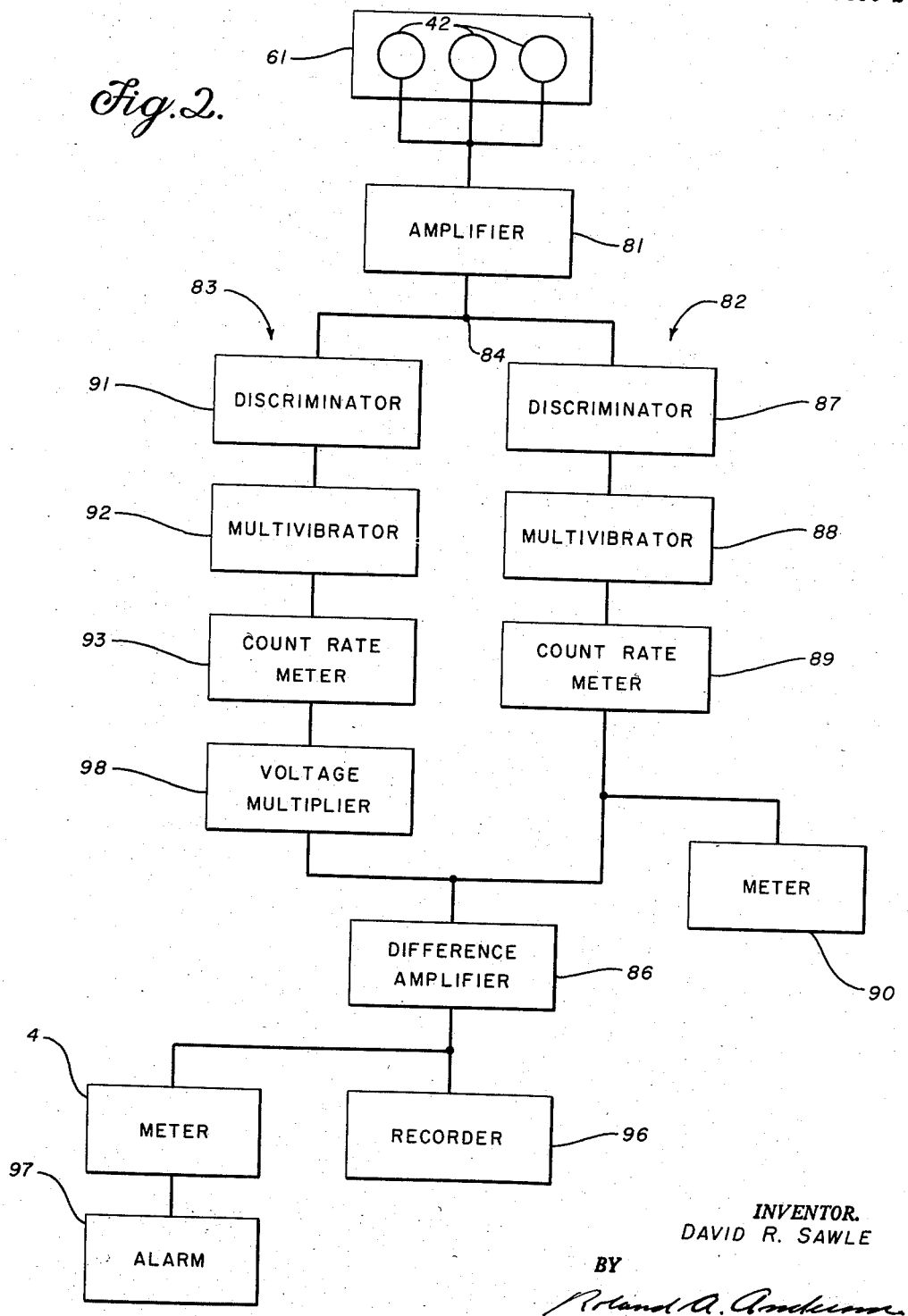

2,892,091

CONTINUOUS ALPHA AIR MONITOR

David R. Sawle, Oakland, Calif., assignor to the United States of America as represented by the United States Atomic Energy Commission Application November 3, 1955, Serial No. 544,844

10 Claims. (Cl. 250—71)

This invention relates in general to alpha air monitors and in particular to a highly responsive continuous alpha air monitor that will provide an immediate warning of excessive atmospheric contamination by dangerous alpha activity, as well as a continuous record of the same.

This invention is particularly suitable for use in areas where alpha emitting materials are being handled and where it is essential to provide a means of immediately warning the personnel involved if the contamination level exceeds the permissible level.

Heretofore, in the prior art, the aforesaid alpha contamination is frequently monitored by filter material through which air from a contaminated zone is filtered and thereafter the natural alpha activity is allowed to decay off before such filter material is counted in conventional electronic counting equipment to determine a measure of the longer life dangerous alpha activity. This method provides very high sensitivity but low response, i. e., on the order of forty-eight hours, and thus would be impracticable for use as an immediate warning device.

Apparatus presently employed as warning devices for dangerous alpha contamination above the permissible level generally utilize dual detectors wherein the first mentioned detector senses natural air alpha background in an uncontaminated zone, and the second detector senses total alpha activity in a contaminated zone, and thereafter the difference is determined electronically to provide a measure of the dangerous alpha contamination. Such apparatus provides relatively high response, i. e., approximately one hour, but low sensitivity due to the appreciable variation of alpha background in different locations.

The monitoring device of the present invention overcomes the low response and low sensitivity of the aforesaid apparatus known in the art by advantageously utilizing the characteristics of alpha emitters, viz., the energy of the short lived natural activity is approximately thirty percent higher than the energy of the longer lived dangerous alpha activity. This is accomplished by utilizing a detector, or detectors to sense total alpha activity in a contaminated zone and electronically separating the low energy dangerous alpha activity to provide an immediate measure of dangerous alpha contamination and thus render the monitor to high response and practicability as a warning device.

It is therefore an object of the present invention to provide a new and improved alpha air monitor.

It is another object of the present invention to provide an alpha air monitor that will provide an immediate warning of high-level airborne alpha contamination.

An additional object of the present invention is to provide an alpha air monitor that will provide a continuous chart record of the high-level airborne alpha contamination.

A further object of the present invention is to provide a continuous alpha air monitor that will operate independently of a noncontaminated area.

An important object of the present invention is to provide a continuous alpha air monitor that electronically separates the low energy dangerous alpha activity from the higher energy natural alpha activity.

A still further object of the present invention is to provide a continuous alpha air monitor adaptable to miniaturization of facilitate its utilization as a portable monitoring device.

The invention, both as to its organization and method of operation, together with further objects and advantages thereof, will best be understood by reference to the following specification taken in conjunction with the accompanying drawing, of which Figure 1 is an elevation view, partly broken away, of a preferred embodiment of the continuous alpha air monitor probe unit assembly; and Figure 2 is a schematic diagram of the circuit components of the invention.

Briefly, such an alpha air monitor, constructed in accordance with the invention, includes means for filtering air from an atmosphere containing alpha activity and scintillation detector means arranged to provide a signal proportional to the total alpha activity of such air. An electronic circuit is provided to discriminate between the low energy dangerous alpha activity and the higher energy natural alpha activity and is connected to a recording device to provide a continuous record of the lower energy dangerous alpha activity. An alarm is connected to the aforesaid electronic circuit to serve as a warning when the dangerous alpha activity exceeds the permissible level.

The monitor operates on the principle that the daughter products of radon collected by the aforementioned filtering means reach equilibrium in a short time and that 94% of the alpha particles emitted have energies of 7.68 mev. This is substantiated by experiment and theoretical evidence noted below.

The natural radioactivity collected by filtering is mainly due to the daughter products of radon. Thoron also contributes some of the natural activity, but it has been shown by experiment and theoretical evidence hereinafter disclosed that its influence on the device of the invention may be neglected. Considering now the radon (Rn) decay series, viz.,

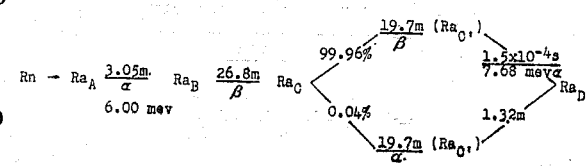

Radon in air is essentially at equilibrium with these daughter products so that for every disintegration of a radon atom, an atom of radium A in the air will disintegrate, i.e., $$\frac{dn}{dt} Rn = \frac{dN_A}{dt} = \frac{dN_B}{dt} = \lambda_A N_A = \lambda_B N_B \text{ etc.}$$

where:

$N_A, N_B, N_C, N_{C'}$ are the number of atoms of radium A, B, C, C' respectively.

$\lambda_A, \lambda_B, \lambda_C, \lambda_{C'}$, are the decay constants of radium A, B, C, C', respectively, and $t$ is the sampling time.

After air has been filtered for a short time, the activity built up on the filter paper from the addition of more particles plus that due to the decay of the previous daughter products will equal the amount decaying, such that the number of atoms of radium A, B, C, and C' on the filter paper will remain constant.

Therefore:

(1) $$\frac{dN_A}{dt}=\frac{F\rho}{\lambda_A}\lambda_{Rn}-\lambda_A N_A=0$$

(2) $$\frac{dN_B}{dt}=\frac{F\rho}{\lambda_B}\lambda_{Rn}+\lambda_A N_A-\lambda_B N_B=0$$

(3) $$\frac{dN_C}{dt}=\frac{F\rho}{\lambda_C}\lambda_{Rn}+\lambda_B N_B-\lambda_C N_C=0$$

(4) $$\frac{dN_{C'}}{dt}=\frac{F\rho}{\lambda_{C'}}\lambda_{Rn}+\lambda_C N_C-\lambda_{C'} N_{C'}=0$$

Where:

F is the flow rate through the filter paper expressed as volume per unit time.

$\rho$ is the concentration of radon in the air expressed as the number of atoms per unit volume.

$\lambda_{Rn}$ is the decay constant of radon expressed as reciprocal time.

Using Equation 2 preceding as an example, $F\rho\lambda_{Rn}$ represents the atoms of radon flowing through the filter times its decay constant, which is equal to the number of atoms of radium B on the filter times its decay constant.

$$\frac{F\rho\lambda_{Rn}}{\lambda_B}$$

therefore represents the atoms of radium B being collected on the filter. $\lambda_A N_A$ represents the number of atoms of radium B which exist due to the decay of radium A expressed as atoms per unit time. $\lambda_B N_B$ represents the number of atoms of radium B decaying expressed as atoms per unit time. The sum $$\frac{dN_B}{dt}$$

would equal the change in the number of atoms of radium B which at equilibrium is zero. Adding Equations 1, 2, 3, and 4 gives:

$$N_{C'}\lambda_{C'}=F\rho\lambda_{Rn}\left[\frac{1}{\lambda_A}+\frac{1}{\lambda_B}+\frac{1}{\lambda_C}+\frac{1}{\lambda_{C'}}\right]$$

Since radium A and radium C' are the only alpha emitters in the decay series, the percent of alpha particles emitted from the activity on the filter paper due to the radium C', having energies of 7.68 mev., can be calculated as follows:

$$\frac{N_{C'}\lambda_{C'}}{N_A\lambda_A}=\frac{F\rho\lambda_{Rn}\left[\frac{1}{\lambda_A}+\frac{1}{\lambda_B}+\frac{1}{\lambda_C}+\frac{1}{\lambda_{C'}}\right]}{\frac{F\rho\lambda_{Rn}}{\lambda_A}}$$

$$=\lambda_A\left[\frac{1}{\lambda_A}+\frac{1}{\lambda_B}+\frac{1}{\lambda_C}+\frac{1}{\lambda_{C'}}\right]$$

Since $$\lambda=\frac{0.693}{T}$$

where $T_1$ is the half life.

$$\frac{N_{C'}\lambda_{C'}}{N_A\lambda_A}=\frac{1}{T}[T_A+T_B+T_C+T_{C'}]$$

$$=\frac{1}{3.05}\left[3.05+26.8+19.7+\frac{164}{60}\times 10^{-6}\right]$$

or $$\frac{N_{C'}\lambda_{C'}\times 100}{N_{C'}\lambda_{C'}+N_A\lambda_A}=\frac{1630}{1730}=94\%$$

Thus 94% of the alpha particles emitted from the activity on the filter paper are from radium C', having energies of 7.68 mev. This is at least 30% greater in energy than the alpha particles emitted by the dangerous isotopes such as $Ur^{234}$ (4.76 mev. alpha emitter) and $Pu^{239}$ (5.15 mev. alpha emitter), which can be separated electronically as hereinafter described.

As previously mentioned, thoron also contributes some of the natural activity, which may be neglected as substantiated by the following theory:

Thoron decays to thorium A which decays to thorium B. Thorium A has a short half life (0.16 second) and very little is collected on the filter paper, and thus the effect of thorium A may be neglected. Thorium B decays as follows:

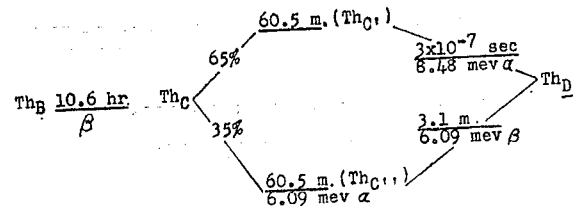

From the preceding decay scheme it can be seen that 65% of the alpha particles from the thoron decay products on the filter paper will be 8.48 mev. alpha particles from thorium C'. The remaining 35% are from thorium C'' with a lower energy (6.09 mev.). The $Th_{C'}$ 8.48 mev. alpha particles have a higher energy than the $Ra_{C'}$ 7.68 mev. alpha particles, so that a greater percentage of the total alpha particles will show up as high energy pulses which tends to reduce the difference between the thoron daughters, (65% of which are high energy), and the radon daughters, (94% of which are high energies). As previously noted it has been found by experiment that thoron does not influence the results significantly if the filter papers are changed frequently in atmospheres containing large quantities of thoron.

Referring now to the accompanying drawing, and more particularly to Fig. 1, means for filtering air from an atmosphere containing alpha activity is provided by an airtight housing 11 apertured for air intake and air exhaust, and in which filter paper 12 is arranged such that air may be caused to filter therethrough. Housing 11 is preferably rectangular in elevation and square in cross-section (Fig. 1) and preferably constructed of metal plates to facilitate assembly of detector apparatus as hereinafter described in detail. Specifically, housing 11 includes top and bottom plates 13 and 14, front and back plates 16 and 17, and forward and rearward plates 18 and 19 secured together by a plurality of screws 21. The aforesaid plates are preferably constructed of light weight structural material such as aluminum to enhance the practicability of a portable device. Rearward plate 19 is apertured at 22 to provide an inlet passageway for air entering housing 11 through a flanged intake pipe 23 secured to plate 19 by screws 24. Plate 14 is apertured at 26 to provide an exhaust passageway for air leaving housing 11. One extremity of a pipe nipple 27 is disposed in aperture 26 and the other extremity is connected to a blower (not shown) which provides a means to draw air through housing 11.

A movable rectangular filter rack 28 is provided to support filter paper 12 within housing 11 and further provide accessibility to such filter paper to facilitate removal or replacement of the same. Filter rack 28 includes a handle 29 secured through a stop plate 31 to a rectangular filter support plate 32 by screws 33. Filter rack 28 enters housing 11 through a rectangular slot 34 located horizontally across forward plate 18. A gasket 36 is disposed between stop plate 31 and forward plate 18 so that an airtight seal is maintained between rack 28 and housing 11 when rack 28 is positioned entirely within housing 11, as shown in Fig. 1 of the drawing. Filter rack 28 is supported above bottom plate 14 of housing 11 in slideable relationship by a support shelf 37 constructed of metal strips disposed on bottom plate 14 about the interior periphery of housing 11. Shelf 37 is of such a height as to position rack 28 horizontally between intake pipe 23 and exhaust nipple 27 and provide a substantial unobstructed region between rack 28 and bottom plate 14. Ballbearings (not shown) may be disposed in the top surface of shelf 37 to enable filter rack 28 to be more readily slideable thereon.

A plurality of equally spaced countersunk bores 38 are provided in rack 28 to provide air passageways between the area above rack 28 in which air enters housing 11 through aperture 22, and the aforesaid unobstructed region between rack 28 and plate 14 from which air exhausts through aperture 26. The annular enlarged extremities of bores 38 form annular shelves 39 in the upper surface of rack 28 on which filter paper 12 in the form of discs is disposed. Therefore the dust particles in the air drawn through housing 11 will be collected on filter paper discs 12.

Detector means are provided to measure the alpha activity of the dust particles collected on filter paper 12 and include a plurality of identical scintillation detectors 41 arranged to provide a signal proportional to the total alpha activity of the atmosphere being monitored. Each detector 41 comprises a photomultiplier tube 42 encompassed by the upper cylindrical portion of a hollow metallic member 43 which serves as a tube shield 44. The lower portion of member 43 tapers outward forming a truncated conical reflector 46 in which the interior surfaces are highly polished. At the intersection of shield 44 and reflector 46, member 43 is outwardly flanged at 47 for purposes of securing member 43 to housing 11 as hereinafter described. The interior surface of reflector 46 intersects the interior surface of shield 44 in an annular interior ledge or shelf 48. A semispherical polymethyl methacrylate lens 49 having a peripherally extending raised portion 51 at its flat base is disposed on shelf 48 and terminates radially outward at the interior surface of shield 44. The tapered lower termination of member 43 (reflector 46) is outwardly flanged at 52 to provide a means of securing a circular poly-methyl methacrylate plate 53 thereto as by means of screws 54. Silver activated zinc sulfide 56 is coated on the bottom surface of plate 53 to provide a scintillator which will emit photons upon impingement by alpha particles.

The number of detectors 41 coincide with the number of filter paper discs 12 which depend on the magnitude of filter area necessary for the particular pumping speed at which air is caused to flow through housing 11, and the structural and filtering properties of the type of filter paper utilized, i.e., the size of each disc 12 is limited by the rate of air filtered therethrough and the ability of such filter paper to remain seated on shelves 39 without buckling while permitting air to flow through bores 38 only after it is filtered. Three discs 12 formed of four and three-quarter inch molecular filter paper are capable of providing sufficient filter area to pass 16 c.f.m. of air without undesirable effects, such as the aforementioned buckling.

Each detector 41 is secured in housing 11 and arranged such that plate 53 is spaced a short distance above filter paper disc 12 in coaxial alignment, more specifically tube shield 44 extending through an aperture 57 in plate 13. Each detector 41 is supported on housing 11 by securing flange 47 of member 43 to the lower surface of plate 13 by fasteners 58 extending through an interposed annular sealing element 59.

Tubes 42 are mounted in a rectangular photo tube chassis 61 by suitable means such as tube socket clamps 62. Chassis 61 is supported on the top terminations of shields 44 and positioned thereon by flanged rings 63 secured to chassis 61 by screws 64 such that rings 63 slip over the top terminations of the corresponding shields 44. Chassis 61 is maintained rigidly on shields 44 by annular friction connectors 66 disposed in clamping relationship around rings 63 and shields 44.

Photo tube chassis 61 is comprised of a top plate 67 (photo tube chassis cover), a bottom plate 68, end plates 69 and 71, and front and back plates 72 and 73 at the forward and rearward extremities respectively. Bottom plate 68 is preferably bent upward to form end plates 69 and 71 and reentrant extremities 74 to which cover 67 may be secured by fasteners 76. The base of each of tubes 42 extends through respective apertures 77 formed in base plate 68 in coaxial alignment with shields 44. Tube socket clamps 62 are secured to plate 68 by fasteners 78 and are arranged to clamp around the bases of tubes 42 such as to orient tubes 42 in shields 44 with the sensitive area of each tube 42 positioned just above the flat base of each lens 49.

In its mechanical aspects, the operation of the structure of Fig. 1 is briefly as follows. A conventional blower (not shown) is connected to nipple 27 such that air from the surrounding atmosphere is drawn into housing 11 at a constant flow rate through air inlet pipe 23. Such air is then filtered through filters 12 and the airborne activity is collected thereon. The alpha particles, emitted from the airborne activity collected on filters 12 that strike the coatings of silver activated zinc sulfide 56 on polymethyl methacrylate plates 53, cause photons to be emitted therefrom. Such photons will then pass through each lens reflector system comprising reflector 46 and lens 49 which direct the photons to the sensitive areas of each tube 42. Tubes 42 are connected in series and generate a signal proportional to the total alpha activity in the air being monitored.

The hereinbefore-mentioned electronic circuit, provided to discriminate between the portion of the above-mentioned signal representing the low energy dangerous alpha activity and the portion representing the higher energy natural alpha activity is shown in Fig. 2 of the drawing. The latter comprises an amplifier 81 connected to photo tubes 61 to amplify the total signal therefrom representing the total alpha activity. A total energy channel 82 and a high energy channel 83 are commonly connected in parallel at juncture 84 to amplifier 81 and each terminates at different input terminals of a difference amplifier 86. Total energy channel 82 includes a discriminator 87 having its grid biased such that only pulses having an amplitude greater than noise will be amplified and transmitted to the input of a multivibrator 88 which converts each pulse to a square wave pulse of uniform height and duration. These square wave pulses are then applied to a count rate meter 89 which consists essentially of capacitors and resistors in parallel and converts the pulses to a voltage proportional to the number of pulses received representing the total airborne alpha activity. A meter 90 is connected between count rate meter 89 and difference amplifier 86 to provide an indication of the aforesaid total airborne alpha activity. High energy channel 83 includes a discriminator 91 having its grid biased such that only pulses having an amplitude greater than that representing alpha activity above 6 mev. are allowed to pass. Similarly a multivibrator 92 and a count rate meter 93 are provided to supply a voltage representing the airborne alpha activity having energies greater than 6 mev. The output voltages of count rate meters 89 and 93 are applied to differencing network 86 which produces a difference voltage proportional to the alpha activity under 6 mev. which represents the activity due to the dangerous long lived alpha emitters. This difference voltage is applied to a meter 94 and a recorder 96 which provides a continuous record of the dangerous alpha activity present in the atmosphere being monitored.

A warning device is provided by a conventional alarm 97 connected to meter 94, and adjusted to ring whenever the dangerous alpha activity exceeds a predetermined permissible level.

It will be noted here that all pulses over 6 mev., i.e., those pulses traversing channel 83, are multiplied electronically by a constant built into a voltage multiplier 98 connected between count rate meter 93 and difference amplifier 86 to correct for geometry and absorption factor. The value of this constant may have to be adjusted to suit a particular condition but should stay nearly the same for any one condition. Theoretically it should be $$\frac{1}{0.94}$$

as derived hereinbefore from the radon (Rn) decay series, but must be made greater to allow for energy losses which are described as follows:

(1) Alpha particles which hit the scintillating screen (plate 53 with coating 56) at an angle have passed through enough air to reduce their energy appreciably, and will produce smaller pulses.

(2) Particles which are deeply imbedded in filter paper 12 will produce lower energy pulses or not be counted at all. Use of molecular filter paper reduces this effect to a minimum.

(3) Some of the alpha particles will hit scintillators 56 in such a manner that the quantity of photons transmitted to photo tubes 42 is less than expected, or the photons may strike tubes 42 in such a way that the pulses transmitted are not of the expected magnitude.

While the invention has been described with reference to a preferred embodiment, it will be apparent to those skilled in the art that numerous variations and modifications may be made within the spirit and scope of the invention and thus it is not intended to limit the invention except as defined in the following claims.

What is claimed is:

1. An alpha air monitor for detecting the dangerous alpha activity of an atmosphere comprising means for collecting dust particles from said atmosphere, detector means for establishing a first signal proportional to the total alpha activity of said dust particles, and electronic means for deriving a second signal proportional to said dangerous alpha activity.

2. An alpha air monitor for detecting the dangerous alpha activity of an atmosphere comprising means for collecting dust particles from said atmosphere, detector means for generating a signal proportional to the total alpha activity of said dust particles, electronic means for converting said signal into a first voltage representing the total alpha activity and a second voltage representing only the alpha activity having energies over 6 mev., and electrical means for indicating the difference of said first and second voltages and thereby establishing a third voltage proportional to said dangerous alpha activity.

3. An alpha air monitor for detecting the dangerous alpha activity of an atmosphere comprising means for collecting dust particles from said atmosphere, detector means for establishing a first signal proportional to the total alpha activity of said dust particles, electronic means for establishing a second signal proportional to said dangerous alpha activity, and recording means for providing a continuous record of said dangerous alpha activity.

4. An alpha air monitor for detecting the dangerous alpha activity of an atmosphere comprising means for collecting dust particles from said atmosphere, scintillation detector means for establishing a signal proportional to the total alpha activity of said dust particles, an amplifier for amplifying said signal, a first and second channel commonly connected in parallel to said amplifier, said first channel passing all pulses over noise thereby establishing an output voltage proportional to said total alpha activity, said second channel passing all pulses representing alpha activity having energizes greater than 6 mev. and producing an output voltage proportional thereto, and a difference amplifier comparing said first and said second channel output voltages thereby establishing a second signal proportional to said dangerous alpha activity.

5. An alpha air monitor as described in claim 4 wherein said first channel comprises a discriminator passive to all pulses having an amplitude greater than noise, a multivibrator for converting said pulses to square wave pulses of uniform height and duration, and a count rate meter for converting said square wave pulses to a voltage proportional to the number of said square wave pulses.

6. An alpha air monitor as described in claim 4 wherein said second channel comprises a discriminator passive to all pulses having amplitudes greater than that representing alpha activity over 6 mev., a multivibrator for converting said pulses to square wave pulses of uniform height and duration, and a count rate meter for converting said square wave pulses to a voltage proportional to the number of said square wave pulses.

7. An alpha air monitor as described in claim 6 wherein said second channel includes a voltage multiplier having a built-in correction circuit for multiplying said pulses by a correction constant.

8. An alpha air monitor for detecting the dangerous alpha activity of an atmosphere comprising means for collecting dust particles from said atmosphere, scintillation detector means for establishing a signal proportional to the total alpha activity of said dust particles, an amplifier for amplifying said signal, a first channel and second channel commonly connected in parallel to said amplifier, a first channel discriminator passive to all pulses having an amplitude greater than noise, a first channel multivibrator for converting said pulses to square wave pulses of uniform height and duration, a first channel count rate meter for converting said square wave pulses to a first voltage proportional to the number of said square wave pulses, a second channel discriminator passive to all high energy pulses having amplitudes greater than that representing alpha activity over 6 mev., a second channel multivibrator for converting said high energy pulses to square wave high energy pulses of uniform height and duration, a second channel count rate meter for converting said square wave high energy pulses to a second voltage proportional to the number of said square wave high energy pulses, a second channel voltage multiplier having a built-in correction circuit for multiplying said high energy pulses by a correction constant, a difference amplifier subtractively comparing said first and said second voltages thereby establishing a second signal proportional to said dangerous alpha activity, and a recording means receiving said second signal for providing a continuous record of said dangerous alpha activity.

9. An alpha air monitor as described in claim 8 wherein said means for collecting dust particles from said atmosphere comprises an airtight housing, a blower for drawing air through said housing, and filter paper arranged in said housing for filtering dust particles from air drawn therethrough by said blower.

10. A continuous alpha air monitor for detecting the dangerous alpha activity of an atmosphere comprising an airtight housing, a blower for drawing air through said housing, filter paper arranged in said housing for filtering dust particles from said air drawn therethrough by said blower, at least one scintillator including a silver activated zinc sulfide surface disposed in said housing in spaced relationship with said filter paper for producing photons upon impingement by alpha particles from said dust particles, at least one lens reflector assembly disposed in airtight relationship in said housing for directing said photons to a predetermined zone, at least one photomultiplier tube for receiving said photons from said zone and establishing a signal proportional to the total alpha activity of said dust particles, an amplifier for amplifying said signal, a first channel and a second channel commonly connected in parallel to said amplifier, a first channel discriminator passive to all pulses having an amplitude greater than noise, a first channel multivibrator for converting said pulses to square wave pulses of uniform height and duration, a first channel count rate meter for converting said square wave pulses to a first voltage proportional to the number of said square wave pulses, a second channel discriminator passive to all high energy pulses having amplitudes greater than that representing alpha activity over 6 mev., a second channel multivibrator for converting said high energy pulses to square wave high energy pulses of uniform height and duration, a second channel count rate meter for converting said square wave high energy pulses to a second voltage proportional to the number of said square wave high energy pulses, a second channel voltage multiplier having a built-in correction circuit for multiplying said high energy pulses by a correction constant, a difference amplifier subtractively comparing said first and said second voltages thereby establishing a second signal proportional to said dangerous alpha activity, recording means receiving said second signal for providing a continuous record of said dangerous alpha activity, a meter receiving said second signal, and an electrical alarm connected to said meter and set to produce an audible noise when said dangerous alpha activity reaches a predetermined permissible level.

References Cited in the file of this patent

UNITED STATES PATENTS

| | | |
|---|---|---|
| 2,659,011 | Youmans et al. | Nov. 10, 1953 |
| 2,708,242 | Ruben | May 10, 1955 |
| 2,750,514 | Armistead | June 12, 1956 |
| 2,751,505 | Anderson | June 19, 1956 |

OTHER REFERENCES

"Monitor Measures Air and Surface Contamination," by Watts et al., from Nucleonics, vol. 13, No. 1, January 1955, pages 51, 52.

A.P.C. application of A. Peycelon et al., Serial No. 376,930, published May 25, 1943.